United States Patent [19]

Saban et al.

[11] Patent Number: 5,448,233
[45] Date of Patent: Sep. 5, 1995

[54] AIRBORNE OBSTACLE COLLISION AVOIDANCE APPARATUS

[75] Inventors: Izhak Saban, Kiryat Hayim East; Sorin Faibish, Haifa; Ezra Shamay, Kiryat Bialik, all of Israel

[73] Assignee: State of Israel, Rafael Armament Development Authority, Haifa, Israel

[21] Appl. No.: 186,959

[22] Filed: Jan. 27, 1994

[30] Foreign Application Priority Data

Jan. 28, 1993 [IL] Israel .................................. 104542

[51] Int. Cl.$^6$ ............................................... G08B 23/00
[52] U.S. Cl. ..................................... 340/963; 340/961; 364/461
[58] Field of Search ............... 340/961, 963, 990, 980; 364/461, 424.06, 449; 342/29, 32, 64, 63, 455; 244/76 R, 175

[56] References Cited

U.S. PATENT DOCUMENTS

| | | | |
|---|---|---|---|
| 2,994,867 | 8/1961 | Pierce | 342/29 |
| 3,052,882 | 9/1962 | Pidhayny et al. | 340/961 |
| 4,646,244 | 2/1987 | Bateman et al. | 340/963 |
| 5,086,396 | 2/1992 | Waruszewski, Jr. | 364/454 |
| 5,128,874 | 7/1992 | Bhanu et al. | 364/461 |
| 5,227,786 | 7/1993 | Hancock | 340/961 |

*Primary Examiner*—Brent Swarthout
*Assistant Examiner*—Benjamin C. Lee
*Attorney, Agent, or Firm*—Mark M. Friedman

[57] ABSTRACT

An airborne obstacle collision avoidance apparatus which includes an object sensor for sensing objects within a field of view of the aircraft and an aircraft navigation system for navigating the aircraft through space. The apparatus also includes a signal processor for receiving data from both the object sensor and the aircraft navigation system, for generating map data of the objects within the field of view of the aircraft, for dynamically changing the map data as the aircraft moves through space and for determining the probability that the aircraft is on a collision course with respect to each sensed object. The apparatus further includes an alarm which is activated when the signal processor determines that there is a high probability that the current aircraft flight direction is on a collision course with respect to a sensed object.

16 Claims, 13 Drawing Sheets

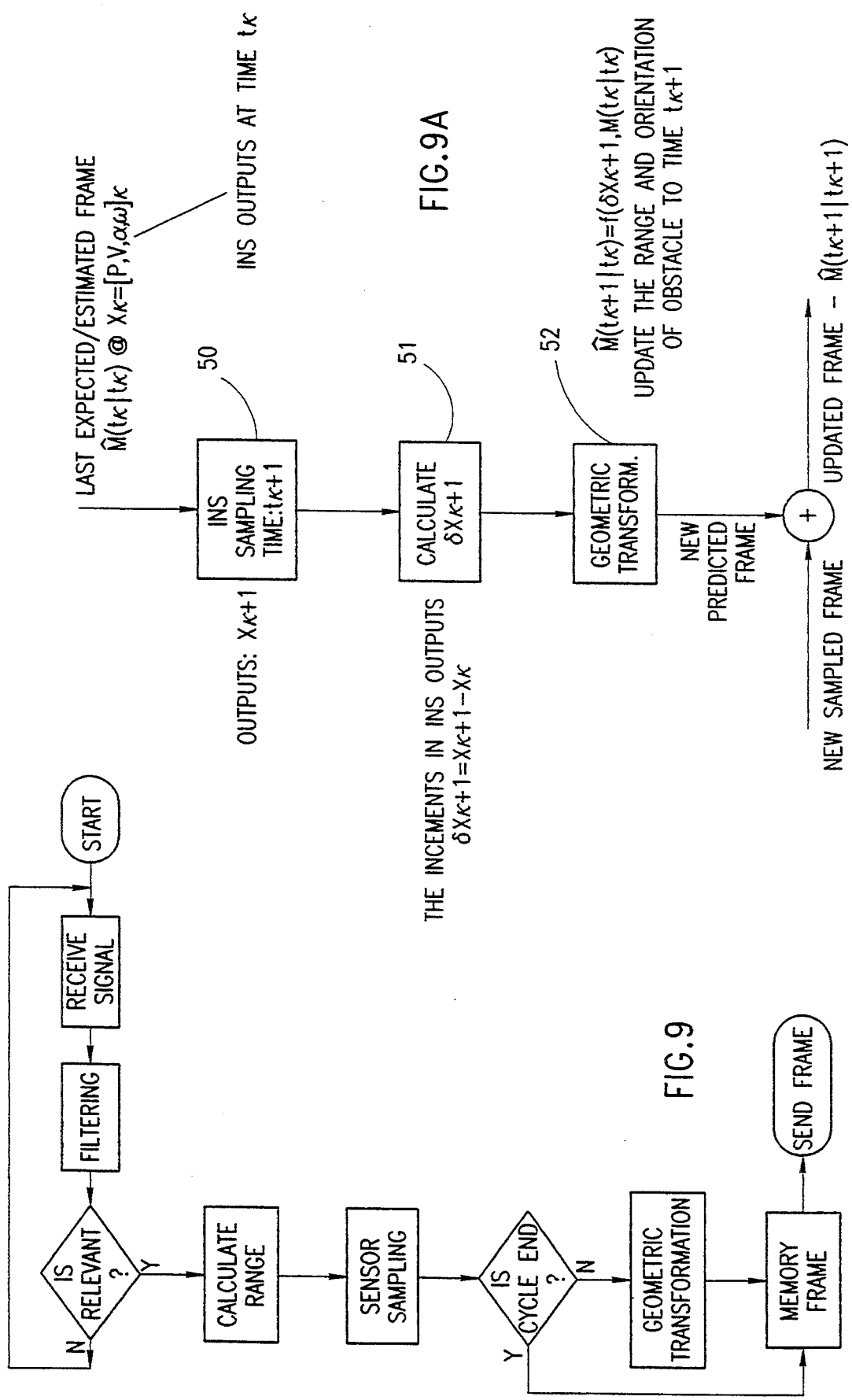

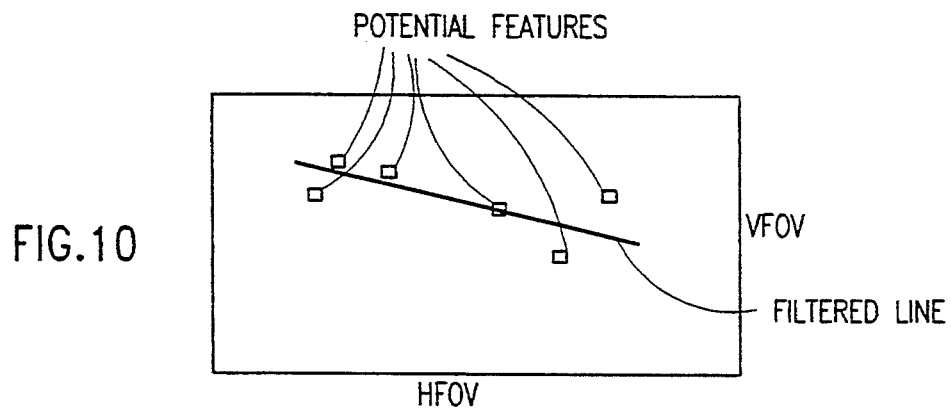
FIG.10
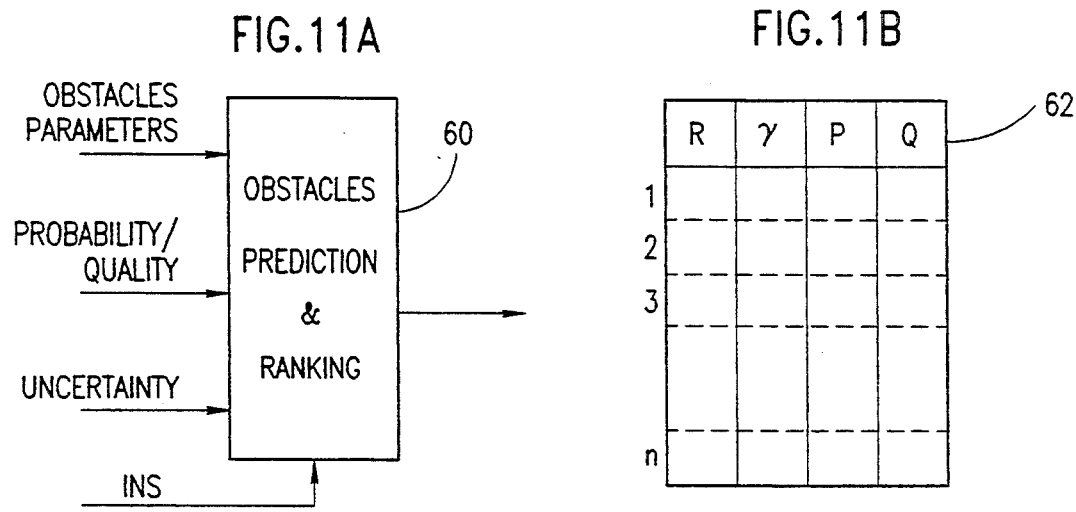
FIG.11A
FIG.11B
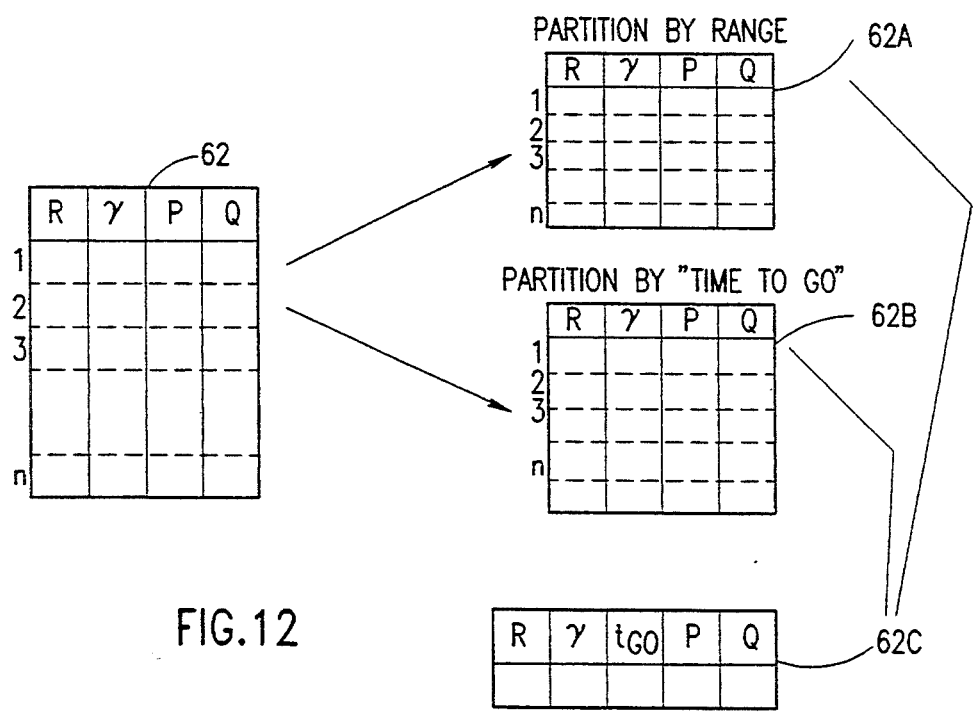
FIG.12

AIRBORNE OBSTACLE COLLISION AVOIDANCE APPARATUS

FIELD AND BACKGROUND OF THE INVENTION

The present invention relates to airborne obstacle collision avoidance apparatus. The invention is particularly applicable in apparatus for avoiding low-flying hazards such as cables, which are particularly hazardous for helicopters, but the invention may be used for avoiding other types of obstacles, such as hills, sand dunes or other terrain formations, other aircraft, etc.

Direct vision is frequently not sufficient to avoid collisions with objects, and many obstacle collision avoidance systems have been designed for this purpose. However, the problem has become particularly serious for helicopters since, even under good conditions with trained users and with the aid of night vision devices, direct vision cannot always reveal power lines, sand dunes, telephone poles, and other such hazards to low flying aircraft.

OBJECTS AND BRIEF SUMMARY OF THE INVENTION

According to the present invention, there is provided an airborne obstacle collision avoidance apparatus, comprising: (a) object sensor means for sensing objects within a field of view of the aircraft; (b) an aircraft navigation system for navigating the aircraft through space; (c) signal processing means for receiving data from both the object sensor means and the aircraft navigation system, for generating map data of the objects within the field of view of the aircraft, for dynamically changing the map data as the aircraft moves through space, and for determining a probability that the aircraft is on a collision course with respect to each sensed object, the signal processing means further including a straight line filter to extract straight line features from the map data in order to facilitate identification of straight line obstacles, such as electric cables and electric poles, the extraction of straight line features being based at least in part on one or more straight line extraction criteria, the selected being selected from the group consisting of: (1) slope of the straight line obstacle relative to ground; (2) height of the straight line obstacle above ground; (3) length of the straight line obstacle; (4) number of the straight line obstacles sensed within the field of view of the aircraft; and (5) continuity of the straight line obstacle; and (d) alarm means for producing an alarm when the signal processing means determines there is a high probability that a current aircraft flight direction is on the collision course with respect to a sensed object.

In the preferred embodiment of the invention described below, the aircraft navigation system is an inertial navigation system.

According to further features in the described preferred embodiment, the alarm means includes a visual display, and display control means for visually displaying thereon the sensed objects and an indication of their probabilities of being located on a collision course with respect to the current flight direction of the aircraft. In addition, the display control means visually displays: in a first color, objects at a relatively large distance from the aircraft; in a second color, objects that will become a danger of collision if no corrective action is taken; and in a third color, objects which represent a danger to the aircraft and require corrective action.

According to still further features in the described preferred embodiment, the display control means also visually displays the range of each detected object having a high probability of being located on a collision course with respect to the current flight direction; it also displays azimuth and elevation, with respect to the current flight direction, of each detected object having a high probability of being located on a collision course with respect to the current flight direction.

According to still further features in the described preferred embodiment, the display control means displays, in full lines, the sensed objects having a high probability of being located on a collision course with respect to the current flight direction, and in broken lines, spaced at a distance from the full lines of the sensed objects, an uncertainty region caused by measurement noise and disturbances.

According to still further features in the described preferred embodiment, the apparatus further includes guidance command generator means for generating an emergency escape flight guidance path, and for displaying the escape path to the pilot, in the event the signal processing means determines there is a danger of an imminent collision with an object.

Further features and advantages of the invention will be apparent from the description below.

BRIEF DESCRIPTION OF THE DRAWINGS

The invention is herein described, by way of example only, with reference to the accompanying drawings, wherein:

FIGS. 9 and 9a are flow charts more particularly illustrating the operation of FIG. 8;

FIGS. 10–12 are diagrams further illustrating operations of the signal processing system;

DESCRIPTION OF A PREFERRED EMBODIMENT

The Overall System

Figure 1:
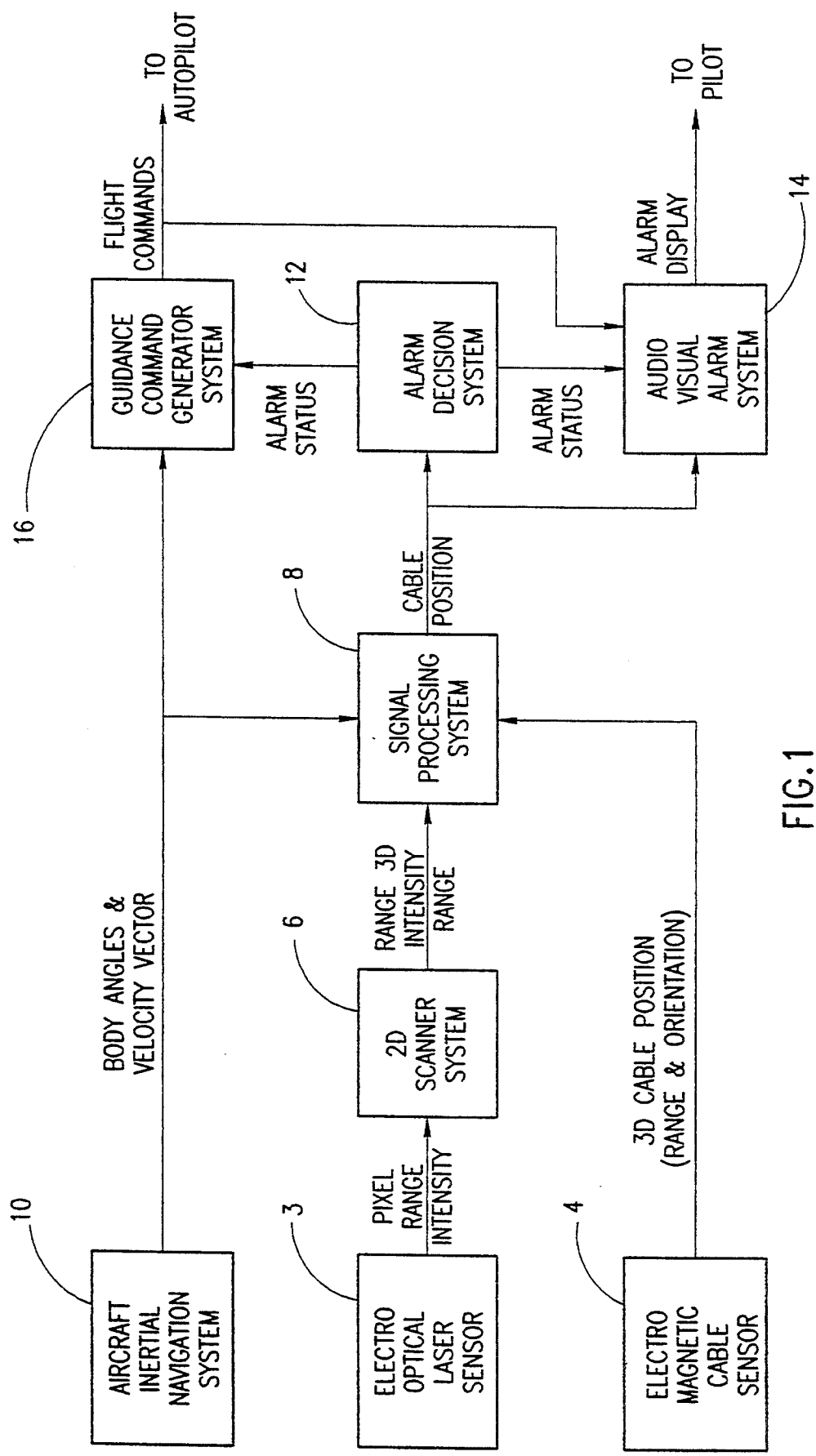
FIG. 1 is a block diagram illustrating one form of airborne obstacle collision avoidance apparatus in accordance with the present invention.

The apparatus illustrated in the drawings is designed to sense a cable or other obstacle in a protected region within the field of view of the aircraft while travelling through space and to estimate the future position with respect to the sensed obstacle and the collision probability. If the apparatus determines there is a high probability that the aircraft is on a collision course with respect to a sensed obstacle, the apparatus also functions to generate alarm signals to the aircraft pilot and collision avoiding flight commands to the aircraft autopilot.

The obstacles can be cables as well as other objects, such as terrain formations and other aircraft, which may constitute obstacles to the aircraft equipped with the system.

As shown in FIG. 1, the illustrated apparatus may include two types of obstacle sensors: an electro-optical laser sensor 3, and an optional electromagnetic cable sensor 4.

The electro-optical laser sensor 3 transmits a laser beam and receives the beam reflected by an object in the line of sight of the laser beam. Sensor 3 measures the time-of-flight and the intensity of the returned laser signal corresponding to a given angular position of the laser beam, and calculates the range by multiplying one-half the time of flight by the light speed. The laser beam is deflected by a 2-D scanning system 6, e.g., a rotating mirror, prism or any other scanning device. The scanning system 6 generates a pattern such that the light beam covers an angular region defined by a horizontal field of view and a vertical field of view as described more particularly below with respect to FIGS. 3 and 4.

The output of the scanner system 6 are 3-D images of both range and intensity in the field of view of the aircraft. These images from sensor 3, together with data from the electromagnetic cable sensor 4, are fed into a signal processing system 8, which also generates a map of the objects within the field of view of the aircraft.

It will be appreciated that the generated map continuously changes with respect to both range and intensity because of the movements of the aircraft. The range and intensity are dynamically updated by the signal processing system 8 by using data of the dynamic movements of the aircraft measured by the inertial navigation system 10 of the aircraft.

The output of the signal processing system 8 is a list of objects in the protected region, as well as the 3-D composite range-intensity image to be displayed to the pilot.

The list of objects contain data concerning the relative position (space and time) of each object with respect to the aircraft. This list is fed to an alarm decision system 12, which generates, for each object in the list, a condition status or warning concerning the danger of collision of the respective object by the protected aircraft.

The 3-D range-intensity images from the signal processing system 8 are also fed to an audio-visual alarm system 14 which displays the images to the pilot. Those objects representing a real collision danger obstacle are emphasized on the display in different colors, each color corresponding to a different alarm level, for example: yellow, for obstacles still at a distance; green, for obstacles becoming a danger if no correcting action is taken; red, for obstacles which endanger the aircraft and should be overcome; and blinking red, for obstacles which must be overcome by an immediate escape sequence.

The illustrated system further includes a guidance command generator system 16. This system receives both the data from the signal processing system 8, and also the alarm status from the alarm decision system 12, and body angles from the inertial navigation system 10. If an imminent danger is present, meaning that at the current velocity and heading of the aircraft a collision is certain in a short time with respect to the pilot response time, the guidance command generator system 16 generates an emergency escape flight guidance command to the autopilot, and a strong audio-visual warning display to the pilot. The pilot may accept the command and validate it, or may override the command with manual flight commands to avoid the obstacle and to stop the warning signals.

Figure 2:
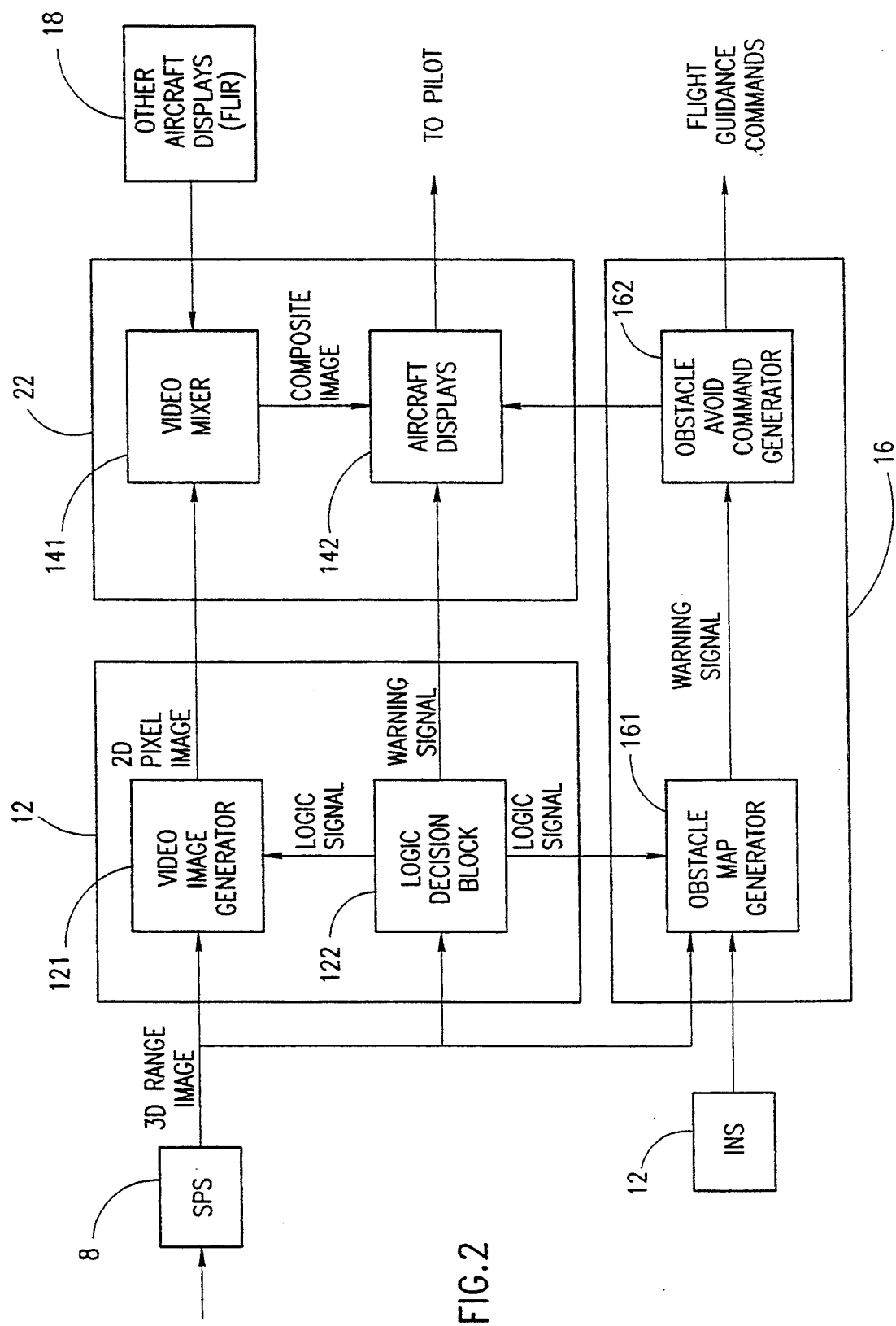
FIG. 2 is a block diagram more particularly illustrating some of the main components in the apparatus of FIG. 1.

FIG. 2 more particularly illustrates the structure of the alarm decision system 12, the audio-visual alarm system 14, and the guidance command generator system 16.

As described earlier, the signal processing system 8 produces dynamically-updated 3-D composite range-intensity images of the protected region as sensed by the laser sensor 3 (FIG. 1), and the cable sensor 4. These are hybrid images combining range and intensity data. These images are not dependent on the day/night conditions, so they have to be adapted for display in any condition.

This 3-D composite range-intensity images from the signal processing system 8 are fed to a video image generator 121, and to a logic decision block 122 in the alarm decision system 12. The video image generator 121 generates 2-D pixel images. These are fed to a video mixer 141 in the audio-visual alarm system 14, to be displayed to the pilot via the aircraft display 142 in the latter system only if there is any information to be displayed, i.e., if the list of obstacles is not empty. The decision as to the existence of information to be displayed is made by the logic decision block 122 in the alarm decision system 12. The latter block outputs an enable signal to the video image generator 121 whenever the list of objects supplied by the signal processing system 8 includes at least one obstacle which represents a danger to the protected aircraft. The logic decision block 122 also generates a warning signal fed to the aircraft displays 142 in the audio visual alarm system 14 for displaying the obstacle to the pilot. The display is color-coded as described earlier to indicate the respective alarm level represented by the detected obstacle.

The logic decision block 122 in the alarm decision system 12 also controls an obstacle map generator 161 in the guidance command generator system 16. Generator 161 also receives the 3-D composite range-intensity image from the signal processing system 8, and also the actual position data of the aircraft from the inertial navigation system 10. Based on this data, the obstacle map generator 161 generates the map of the obstacles from the list generated by the signal processing system 8. This map is projected on the horizontal plane for displaying it on a moving map display, if such a display is available (for helicopters). Also displayed are possible escape paths for each obstacle of the list, as generated by an obstacle avoid command generator 162.

If the logic decision block 122 in the alarm decision system 12 determines that one of the obstacles is a real danger, it causes the obstacle map generator 161 and the obstacle avoid command generator 162 to calculate flight guidance commands for the aircraft to follow in an escape path. These are automatically applied to the autopilot, and also to the aircraft displays 142 to serve as a warning to the pilot. However, the pilot must first validate the flight guidance commands displayed by the aircraft display 142 before they will be automatically implemented to avoid the obstacle.

The other displays in the aircraft (e.g., FLIR) are indicated by box 18 in FIG. 2. These other displays are combined with the 3-D range-intensity image from the signal processing system 8, via the video image generator 121, and a composite image is generated by the video mixer 141 and fed to the pilot via the aircraft displays 142, together with the warning signals generated by the logic decision block 122, and the guidance commands generated by the obstacle avoid command generator 162.

The Geometry of the Protected Region

Figure 3:
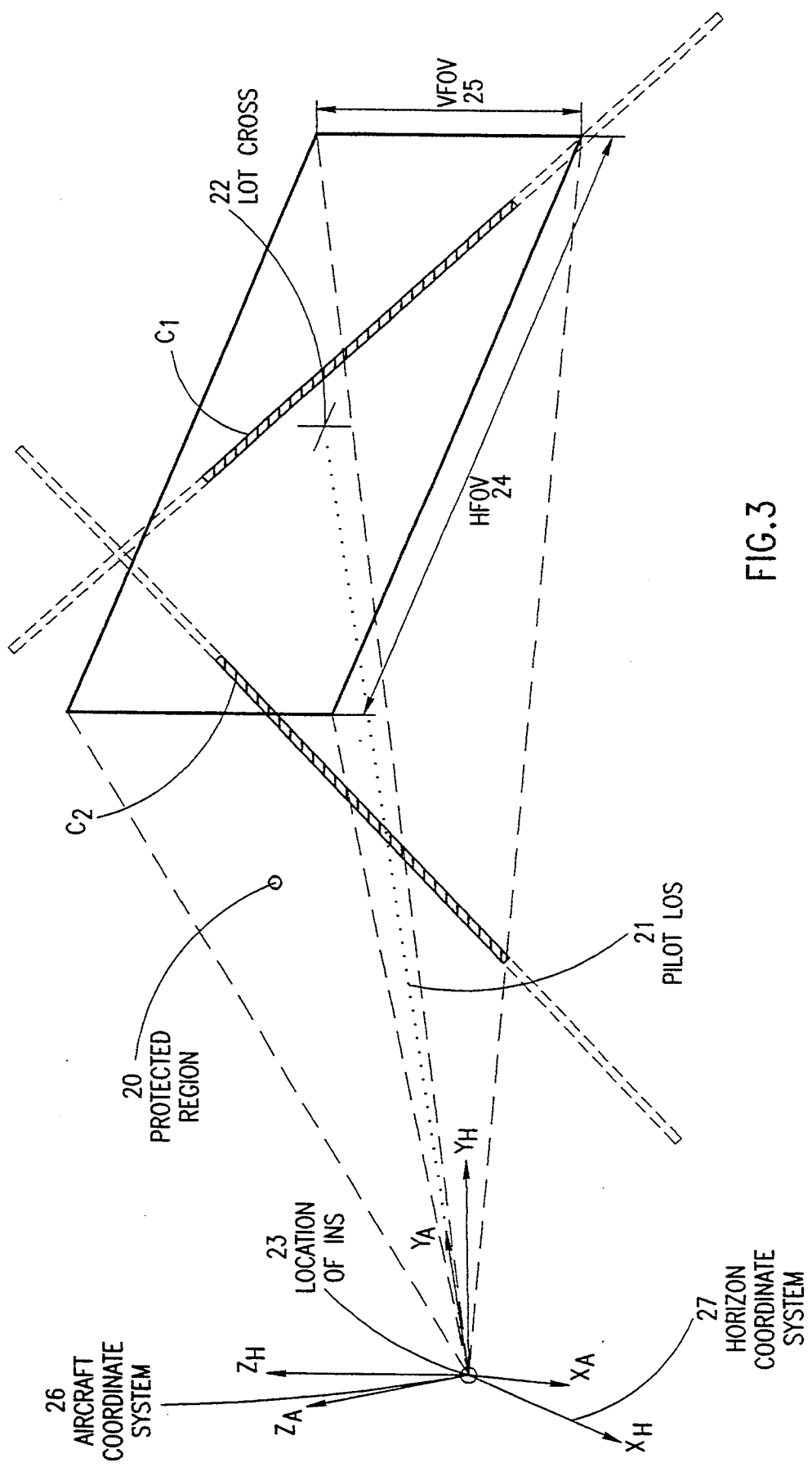
FIGS. 3 and 4a–4e are diagrams illustrating the geometry of the protected region.
Figure 4A:
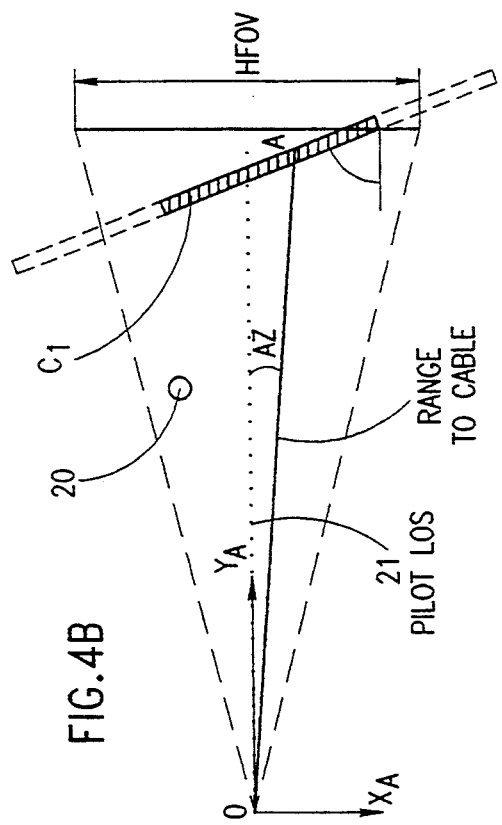
Figure 4D:
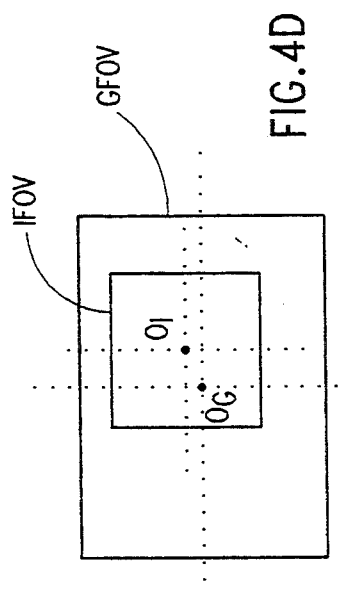
Figure 4B:
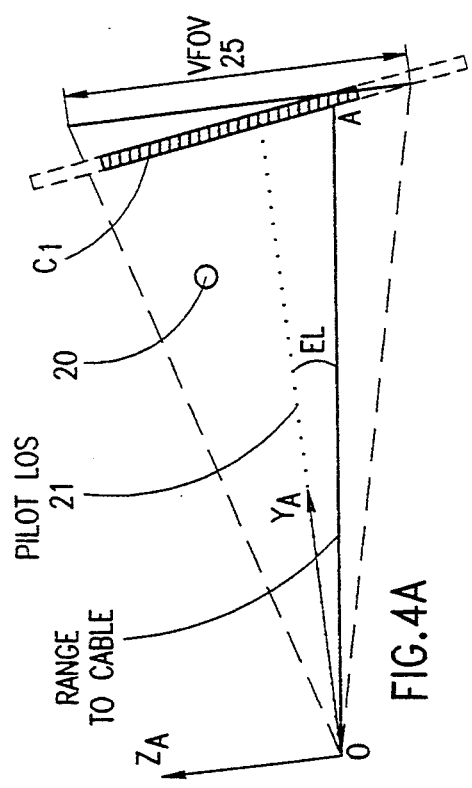
Figure 4C:
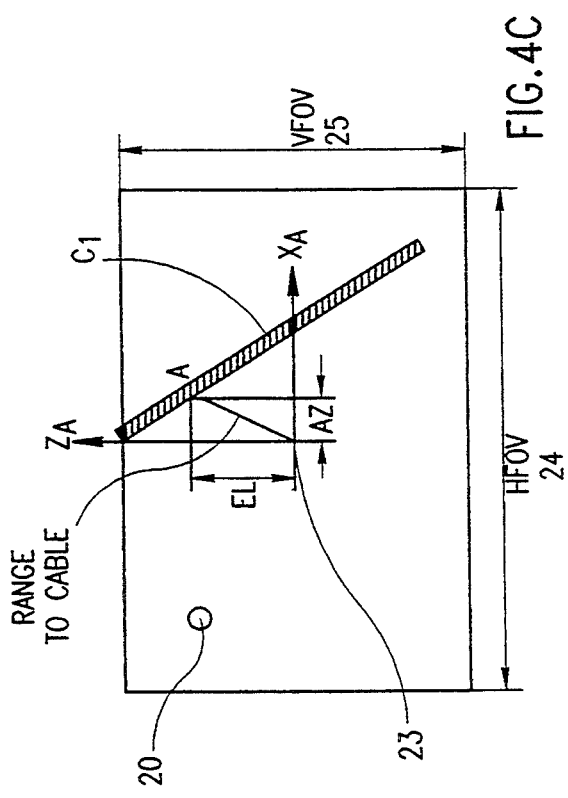

FIG. 3 is a 3-D isometric representation of the protected region, schematically indicated at 20; whereas FIGS. 4a, 4b and 4c represent the projections of the protected region onto the vertical, horizontal and frontal planes, respectively. The pilot's line-of-sight position is represented by broken line 21 passing through a marking (cross) 22 on the display. Both the line-of-sight 21 and the marking 22 move together with the aircraft coordinate system 26 such that the protected region 20 is fixed with respect to the aircraft but contains obstacles which are fixed with respect to the horizon coordinate system 27.

For example, illustrated in FIG. 3 are two obstacles in the form of a first cable $C_1$ and a second cable $C_2$ having different spatial positions in the protected region 20 and moving in different directions relative to the coordinate system 23 of the protected aircraft.

The positions of the obstacles are represented in the aircraft coordinate system (the center of which is at 23), as defined by the aircraft inertial navigation system 10, as $X_a$, $Y_a$, $Z_a$), with the center at point 23 on the aircraft. The obstacles are standing or moving objects, having an absolute position with respect to the horizon coordinate system 27 ($X_h$, $Y_h$, $Z_h$) with the center at point 23 in FIG. 3; i.e., the standing objects move relatively to the aircraft with the same dynamics as the aircraft with respect to the world coordinate system, such as LLLN (Local Level Local North).

The position of a cable with respect to the aircraft is defined by the range to the closest point on the cable, indicated as "A" in FIGS. 4a-4c, and the three angles AZ, EL and DP. The frontal projection illustrated in FIG. 4c shows the image seen by the pilot. For example, the pilot sees cable $C_1$ at angular position AZ, EL, with respect to his line of sight 21, which is identical with the heading of the aircraft as measured by the inertial navigation system 10 (FIG. 1) located at the center 23 of the aircraft coordinate system.

In order to avoid an obstacle, the marking 22 on the display must be away from the point A, the point on the obstacle nearest to the aircraft. If the marking 22 is on point A and no change in the course is made, the aircraft will collide with the cable at point A. In order to avoid the collision, the pilot must fly the aircraft such that the marking 22 will be as far away as possible from point A; that is, the distances AZ and EL (FIG. 4c) should be larger than a minimum value corresponding to the size of the aircraft and its movement disturbances.

If the obstacles are outside the angular region defined by the horizontal field of view (represented by distance 24 in FIG. 3) and the vertical field of view (represented by distance 25 in FIG. 3), the obstacle is irrelevant to the pilot.

The Sensors 3 and 4

As shown in FIG. 1, the system includes two types of sensors, namely an electro-optical laser sensor 3, and an electromagnetic cable sensor 4. The laser sensor 3 is an active one, operating in the RF or in the millimeter spectrum, and transmits laser beams in the direction of the movement of the aircraft to detect dangerous obstacles in its course of travel. The electromagnetic cable sensor 4 may be an active sensor or a passive sensor. An active sensor operates in the RF or millimeter spectrum and illuminates the protected area. A passive sensor receives the electromagnetic energy produced by current flowing through an electric cable.

The objective of the system is to sense any obstacles in the travelling direction by at least one of the above sensors in order to alert the pilot to take evasive action to avoid a collision. By using the two different types of sensors, operating according to two different techniques, there is an increase in the probability of detection and a reduction in the probability of false alarms.

The laser sensor 3 is attached as a rigid body to the aircraft (helicopter or other airborne unit) which serves as a platform. It has a global field of view (GFOV) constituted of the HFOV (horizontal field of view) and the VFOV (vertical field of view), which may have the following values:

HFOV≅50 to 60 deg.

VFOV≅20 to 40 deg.

$f_s$=5 to 20 FOV/sec {scanning rate, number of FOV per second}

The complete region is illuminated by the sensor devices in order to detect the obstacles.

The instantaneous field of view (IFOV) is smaller than the GFOV, as shown in FIG. 4d, in such a way that the IFOV continuously adjusts the values of the parameters HIFOV (instantaneous HFOV) and VIFOV (instantaneous VFOV) based on the flight conditions, velocity, acceleration and height. In this manner, an adaptive FOV value is achieved, so that the IFOV is scanned rather than the GFOV. This technique enables the scanning rate to be increased. In FIG. 4d:

$O_G$ is the center of GFOV; and $O_I$ is the center of IFOV and is dynamically aimed with respect to $O_G$.

Figure 4E:
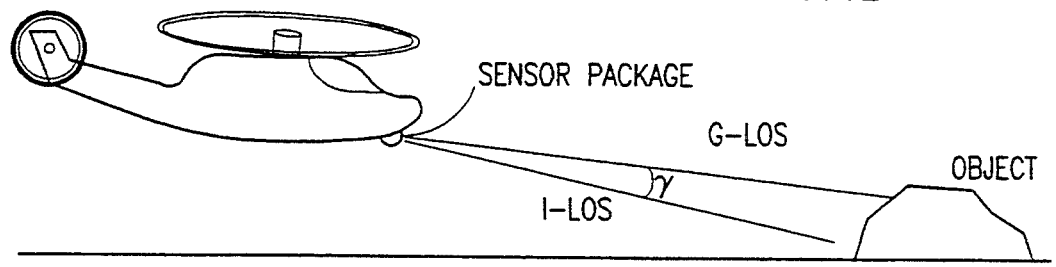

As shown in FIG. 4e, the global line-of-sight (G-LOS) is the line of sight of GFOV which has the center at $O_G$. The instantaneous line-of-sight (I-LOS) is the LOS of IFOV. In this manner, the angle η is changed according to well known adaption rules in order to increase the scanning rate, and therefore the probability of detection.

Figure 5:
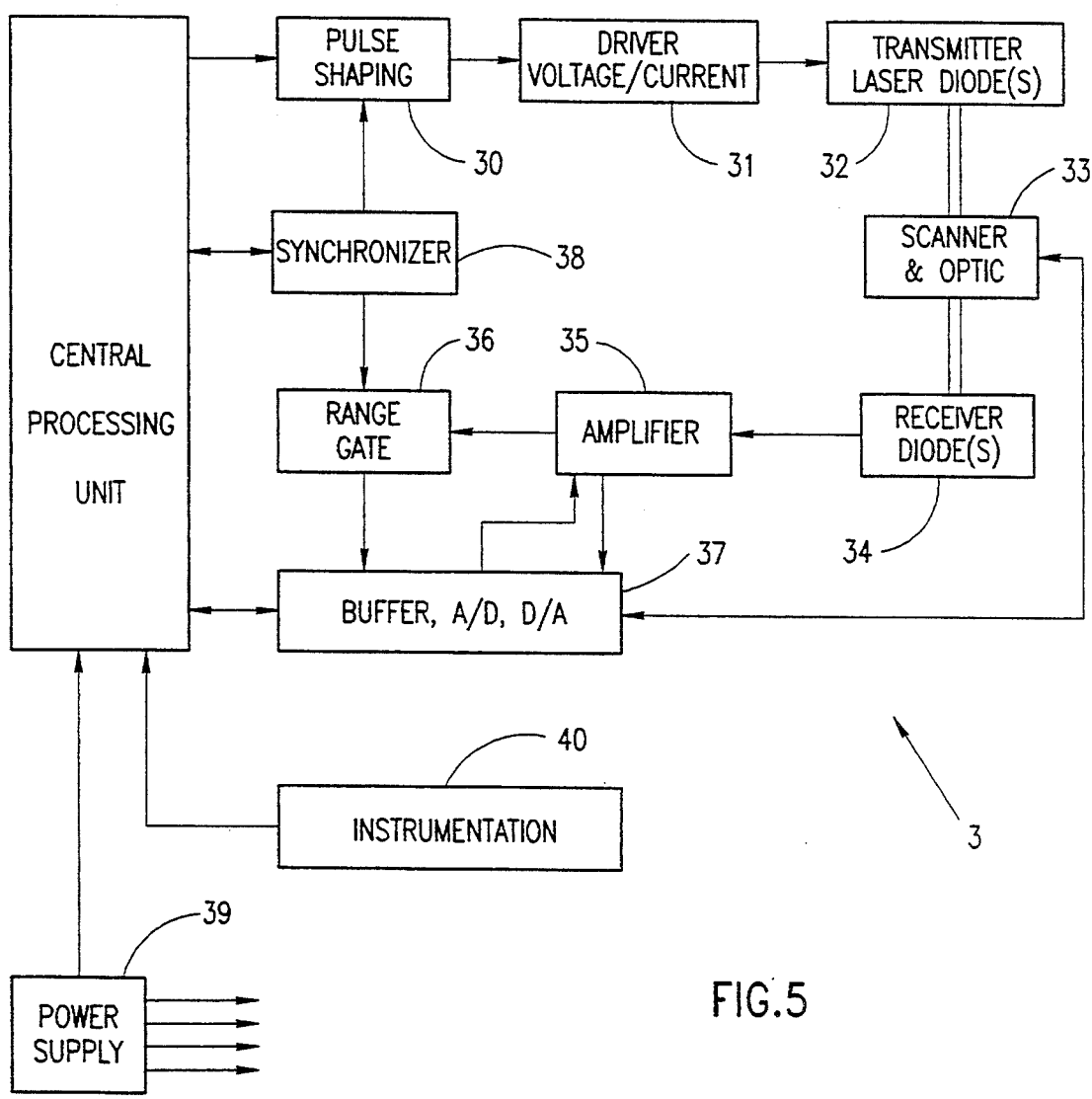
FIG. 5 is a block diagram more particularly illustrating the electro-optical laser sensor in the apparatus of FIGS. 1 and 2.
Figure 6A:
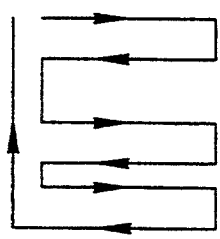
FIGS. 6a–6d illustrate various scanner arrangements which may be used in the electro-optical laser sensor.
Figure 6B:
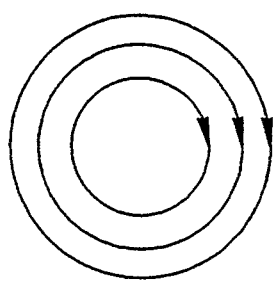
Figure 6C:
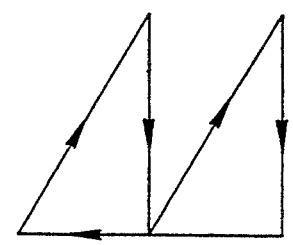
Figure 6D:
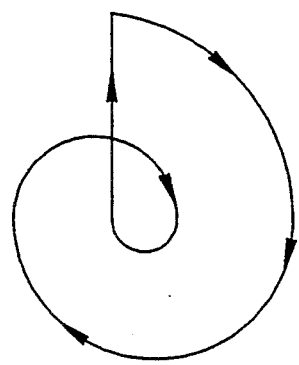

FIG. 5 is a block diagram illustrating the components of the electro-optical laser sensor system 3. Thus, the laser sensor system 3 includes a central processing unit CPU which generates pulses supplied via a pulse shaping circuit 30 and a drive 31 to a laser diode (a single diode or an array of diodes) transmitter 32. The laser pulses are transmitted via a scanner and optic unit, schematically indicated at 33, which includes not only the scanner system 6 (FIG. 1), but also the necessary optics to collimate and direct the photonic energy to the monitored area, to receive the photonic energy reflected therefrom and to direct it to the receiver diodes 34. The received energy is amplified in an amplifier 35 and fed via a range gate 36 and a buffer and A-D converter 37, back to the CPU. The foregoing operations are synchronized by synchronizer 38.

FIG. 5 also illustrates the power supply 39 for controlling the various units of the laser sensor 3. The instrumentation block 40 illustrated in FIG. 5 refers to all the instruments that the aircraft platform (helicopter or other airborne unit) includes, such as the inertial navigation system 10 (FIG. 1), vertical and other gyros, magnetometer, altitude reference unit, velocity meter, GPS (Global Positioning System) unit, etc.

The scanner, included in unit 33 in FIG. 5 or the scanner illustrated at 6 in FIG. 1, may be a conventional electromechanical scanner including a motor that can deflect a mirror or prism to any desired direction in order to transmit the photonic energy to the monitored region in front of the aircraft, and to receive the photonic energy reflected from objects in that region. FIGS. 6a-6d illustrate four types of scanning patterns that may be used: a raster scan in FIG. 6a, a conical scan in FIG. 6b, a saw-tooth scan in FIG. 6c, and a spiral scan in FIG. 6d.

Figure 7A:
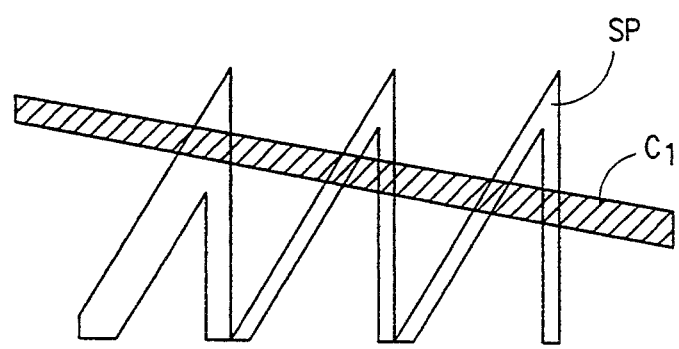
FIG. 7a illustrates the scanner pattern with respect to a cable obstacle in the aircraft field of view.
Figure 7B:
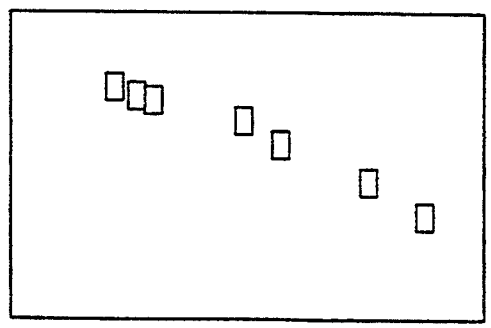
FIG. 7b illustrates the bit map produced, after filtering, as a result of scanning the cable of FIG. 3.

The output of the receiver 34 (FIG. 1) is arranged to create a bit map of the objects within the scanned field of view. FIG. 7a illustrates an object, namely cable $C_1$ being scanned by a saw-tooth scan pattern SP. The information received by the receiver 34, as a result of scanning the cable $C_1$, is fed to the signal processing system 8, as described earlier, where it is modified by the information from the inertial navigation system 10 according to the dynamically changing characteristics of the aircraft as it moves through space. FIG. 7b illustrates the bit map produced as a result of scanning the cable $C_1$ (FIG. 7a) after filtering, and modification by the inertial navigation system 10.

Figure 7C:
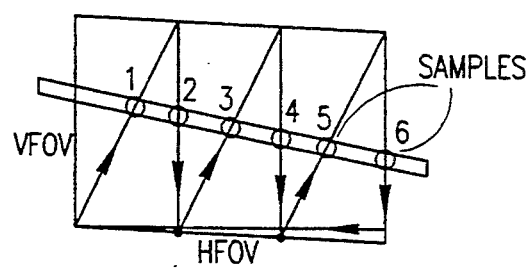
FIG. 7c illustrates a typical scan as a result of scanning the cable of FIG. 3 by a saw-tooth scanning pattern.

Preferably, the cable will be scanned at least five times in each frame. FIG. 7c illustrates an example when using a saw-tooth pattern. The Signal Processing System 8

As indicated earlier, the signal processing system 8 receives the outputs of the two sensors 3, 4 and produces a composite map of all the potential obstacles that relate to the field of view of the aircraft as detected by these sensors; it also receives data from the aircraft inertial navigation system 10 and dynamically changes the generated map of the obstacles as the aircraft moves through space.

Figure 8:
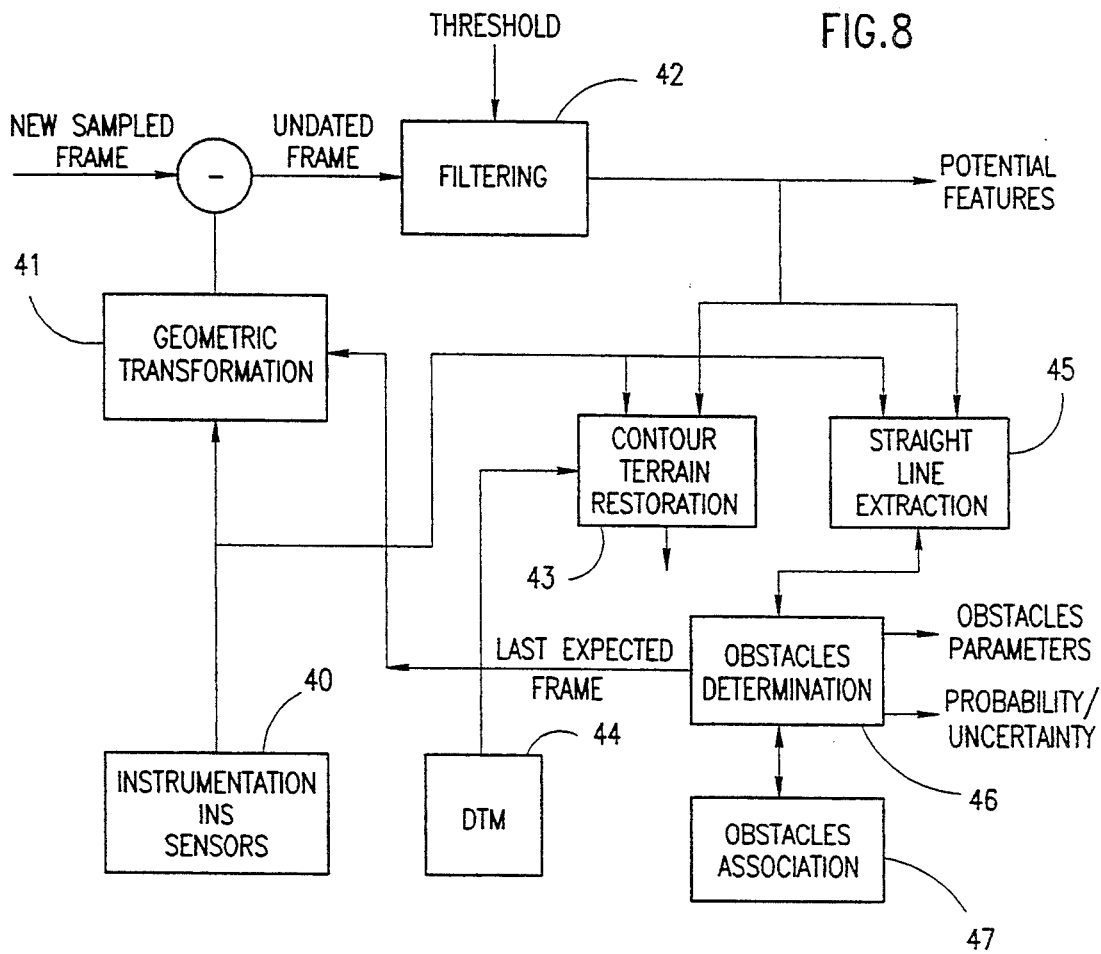
FIG. 8 is a block diagram illustrating operations of the signal processing system in the apparatus of FIGS. 1 and 2.

The signal processing system 8 operates according to the following phases, as illustrated by the block diagram of FIG. 8.

First, the data from the two sensors 3, 4, from the aircraft inertial navigation system 10, and from other instrumentation in the aircraft (all schematically indicated by block 40 in FIG. 8 and as described above with respect to FIG. 5) is used for creating a bit map of all the objects in the field of view detected by the two sensors 3, 4. This data is dynamically updated by the aircraft inertial navigation system 10 as the aircraft moves through space, as indicated by block 41 in FIG. 8 and as described below with respect to the flow charts of FIGS. 9 and 9a.

This data is then filtered, as indicated by block 42, to output potential features which have to be further analyzed.

These potential features are subjected to a contour-/terrain extraction operation to define where is the boundary between the ground and the flight space with respect to the inertial or body reference frame. This operation is performed in block 43 which may also receive data from a digital terrain map (DTM), as shown by block 44. In addition, the potential features from block 42 are subjected to a straight line extraction operation indicated by block 45, in order to define the location of the obstacle, e.g., the electric cables and/or the poles that hold them perpendicular to the terrain contour.

A determination is then made as to the parameters of the obstacles and also the probability/uncertainty of collision with the obstacles, as indicated by box 46 in FIG. 8. This determination is aided by inputted data relating to the various obstacles expected to be encountered, as indicated by box 47 in FIG. 8.

FIG. 9 is a flow chart illustrating the generation of the bit map as described above with respect to FIG. 8, and FIG. 9a more particularly illustrates the geometric transformation operation of FIG. 9, in which the data from the two sensors 3 and 4 is dynamically updated according to the movements of the aircraft as determined by the inertial navigation system 10.

Thus, in order to achieve good matching and integration between samples of the environment (which includes the obstacles, e.g., the cable) at different times, positions and orientations of the aircraft, the output of the inertial navigation system 10 is periodically sampled to provide data regarding the incremental changes in the position and orientation of the aircraft. Thus, as seen in FIG. 8, each sampled frame includes all the information available by that time. The dynamic updating operation "propagates" this frame in time in order that it will be correct and coherent with the next sampled frame. FIGS. 9 and 9a illustrate how this is done.

FIG. 9a illustrates the outputs of the inertial navigation system 10 as $X_k$ being a function of P, V, $\alpha$ and $\omega$, wherein:

P-position
V-velocity
$\alpha$-orientation/attitude
$\omega$-angular velocity

At moment k, there is an estimate map $M(t_k/t_k)$ based on all the information till time k (box 50). At time k+1, there is a different value of INS system 10 output, $X_{k+1}$. The increment from the previous sampling is $\delta X_{k+1}$ so that the map is updated based on the changes in INS outputs (boxes 51 and 52).

For example: if the distance to the obstacle was 200 meters, and it was parallel to the ground, the change in the vehicle position ($\delta X_{k+1}$) was 20 meters; therefore, in the predicted (updated) map the distance at time $t_{k+1}$ will be changed to 180 meters.

In the same way, the distance and the orientation of all the map objects are updated from the previous state.

FIG. 10 illustrates the straight line extraction operation (block 45) in the block diagram of FIG. 8. Since one of the obstacles of particular interest desired to be detected by the system is a cable, the system will include a "straight line extraction" filter to extract any straight lines from the bit map generated by the signal processor system 8.

The filter search for straight line matching in the image-bit map may be based on well known rules for minimizing errors between a sampled image and a desired feature. For example, the MMS (minimum mean square) or LMS (least mean square) rule may be used for this purpose.

The square dots in FIG. 10 illustrate potential features within the field of view, and the straight line indicates a filtered line. The objective is to minimize the error between the filtered (straight) line and the potential (square dot) features.

The filtered line shown in FIG. 10 may also be based on predetermined rules that characterize electrical cables in the field and introduced, e.g., by block 44. Such rules, for example, may relate to:

1. the slope of the cable with respect to the contour/terrain;
2. the minimum and maximum height of the cable above the terrain;
3. the minimum length of the cable if not on the boundary of the image;
4. the maximum number of cables in a single frame; and/or
5. the continuity of the existence of a cable in successive frames.

FIG. 11a illustrates the operation performed by blocks 46 and 47 (FIG. 8) in the signal processing system 8 of predicting and ranking the obstacles detected. These operations are schematically indicated by block 60 in FIG. 11a, and are based on the following inputted data:

(a) obstacle parameters, particularly the range and angle of the obstacle detected by the two sensor 3, 4;
(b) probability/quality of detection;
(c) uncertainty of the values of the parameters; and
(d) position, attitude, velocity, and angular velocity of the aircraft as inputted via the aircraft inertial navigation system 10.

The signal processing system 8 then establishes an object/obstacles potential table, as illustrated at 62 in FIG. 11b, based on all the object parameters and the direction of flight. This table classifies each of the detected objects 1-n, according to the following classifications:

R—range of the object;
γ—attitude/orientation of the object with respect to direction of flight;
P—probability of collision with the object;
Q—quality of decision From table 62, the system knows how to classify and to give priorities to the obstacles with respect to the flight direction.

The data from the aircraft inertial navigation system 10 enables the signal processing system 8 to generate, from table 62, three additional tables as illustrated in FIG. 12 that partition the data of table 62 into three categories, as follows: (a) table 62a, partitioned according to the ranges of all the objects included in the semi-sphere with radius R, which is a predetermined value based on flight conditions; (b) table 62b, partitioned according to the "time-to-go" ($t_{go}$), or time to collision if the aircraft continues in the same flight direction and at the same velocity; and (c) table 62c illustrating the most dangerous object reflected by the two tables 62a and 62b.

The Alarm Decision System 12

As indicated earlier, the alarm decision system 12 includes a video image generator 121 (FIG. 2) which receives the 3-D composite range-intensity images of the protected region from the signal processing system 8, and also a logic decision block 122 which determines the presence of at least one object which represents a danger to the protected aircraft. The logic decision block 122 in mm controls the video image generator 121, the aircraft displays 142 in the audio visual alarm system 14, and the obstacle map generator 161 in the guidance command generator system 16.

Figure 13:
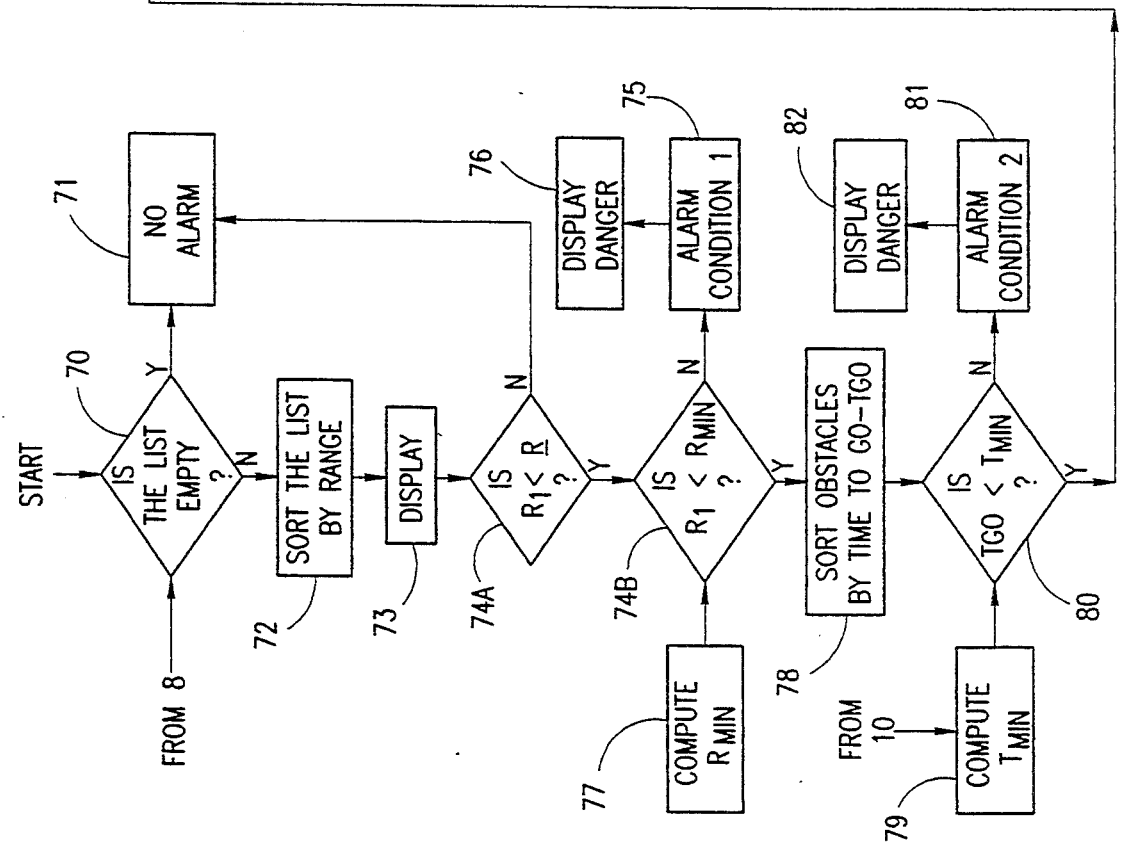
FIG. 13 is a flow chart illustrating the operation of the alarm decision system in the apparatus of FIGS. 1 and 2.

FIG. 13 is a flow chart illustrating the operation of the alarm decision system 12.

The input to system 12 is a list of objects in the protected region which represent present or future dangers to the protected aircraft as detected by the signal processing system 8. This list contains information concerning the range to the obstacle, as well as $t_{go}$ (time-to-go) at the current velocity and heading to a collision with the respective obstacle.

The alarm decision system 12 first decides whether the list "L" is empty (block 70). If so, this means that there is no object present in the protected region. Accordingly, no alarm is generated (block 71), and there is nothing to display to the pilot.

If the list L has at least one element, the list is sorted according to the range to the obstacles (block 72); and the objects are displayed to the pilot (block 73) as detected by the signal processing system 8 with no emphasis as to the level of danger represented by the obstacle.

The list sorted by range is then tested for the existence of objects belonging to a semi-sphere of radius R, where R is calculated according to the maximum measurement range of the sensor, taking into account measurement uncertainty factors. If there is no object in the semi-sphere defined by R, no alarm status is generated (block 74a), and the decision process is restarted from the beginning while the tracking process continues. If there are objects at range less than R, they are tested for closer ranges to the aircraft.

If there is no obstacle closer than $R_{min}$ (block 74b), an alarm condition (No. 1) is generated (block 75) and is displayed (block 76). $R_{min}$ is calculated from dynamic parameters, e.g., maximum acceleration ($a_{max}$) and maximum velocity ($V_{max}$) of the aircraft, such that if the aircraft moves at $a_{max}$ and $V_{max}$, no collision could occur until the next position update of the aircraft inertial navigation system 10. If there are no objects closer than $R_{min}$, the objects inside the ball R are highlighted onto the display as yellow features by box 76.

If there are objects at ranges smaller than $R_{min}$, they are sorted according to $t_{go}$ (time-to-go) until collision would occur when moving at the current velocity and heading (box 78). A minimum time ($t_{min}$) is calculated (box 79) using the data from the aircraft inertial navigation system 10, including the current and maximum velocity and acceleration. If there are no objects with $t_{go}$ less than a minimum time (block 80), an alarm condition (No.2) is generated (block 81), and those objects with $t_{go}$ less than a minimum time $t_{min}$ are highlighted on the display as green features.

If there are obstacles with $t_{go}$ less than $t_{min}$, an alarm condition No.3 is generated (block 83), and the obstacles are displayed as red features; the obstacle with minimum $t_{go}$ is highlighted by blinking red (blocks 84, 85). At the same time, an escape guidance command is generated by the system 16 (block 86), and is displayed to the pilot in blinking red (block 87).

The pilot is then asked for validation of the escape command (block 88). If the pilot validates the command, the guidance command is sent to the autopilot (block 89); but if not, the command is cleared from the display. However, the obstacle with alarm condition No.3 continues to be displayed as blinking red until the pilot changes the course manually.

The Audio-Visual Alarm System 14

Figure 14:
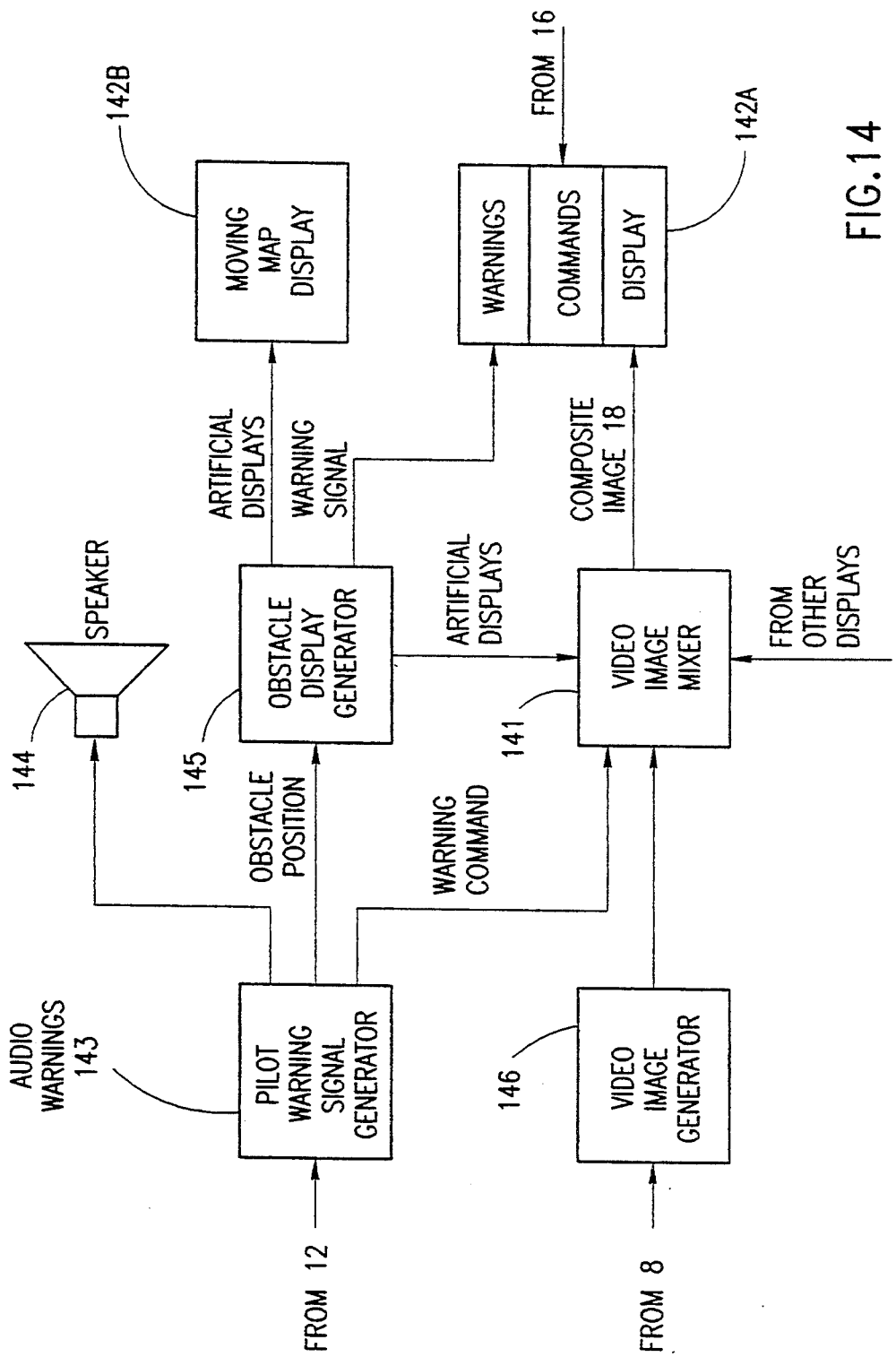
FIG. 14 is a block diagram more particularly illustrating the audio-visual alarm system.

FIG. 14 is a block diagram of the audio-visual alarm system 22. The inputs to this system are the alarm condition status generated by the alarm decision system 12, the data generated by the signal processing system 8, and the flight commands outputted by the guidance command generator system 16. In response to these inputs, the audio-visual alarm system 14 controls the alarm display to the pilot.

The alarm condition status generated by the alarm decision system 12 is applied to a pilot warning signal generator 143, which transforms the logical alarm signals into audio signals and visual signals. The audio signals, such as beeps at variable frequency, are applied to a speaker 144. The visual signals are of two types: (1) warning messages to be displayed as warning signals and commands in aircraft display 142a, and (2) colored graphic features to be displayed in the aircraft moving map display 142b. Both of the latter displays are fed from an obstacle display generator 145 receiving the output of the pilot warning signal generator 143. The obstacle display generator 145 further controls the video image mixer 141 in the audio-visual alarm system 14.

The data from the signal processing system 8 is applied to a video image generator 146 and is transformed into a 2-D image which is also fed to the video image mixer 141. Mixer 141 combines the 2-D images from the video image generator 146 with other displays 18 of the aircraft and with the artificial displays generated by the obstacle display generator 145. The latter generator 145 generates yellow, green and red contours of the obstacles corresponding to the different alarm condition levels, and emphasizes the features generated by the video image generator 121. The resulting 2-D composite image and color features generated by the video image mixer 141 are displayed to the pilot in the display 142a. This display also includes the suitable warning messages generated by the obstacle display generator 145, and the flight commands generated by the guidance command generator system 16.

Figure 15:
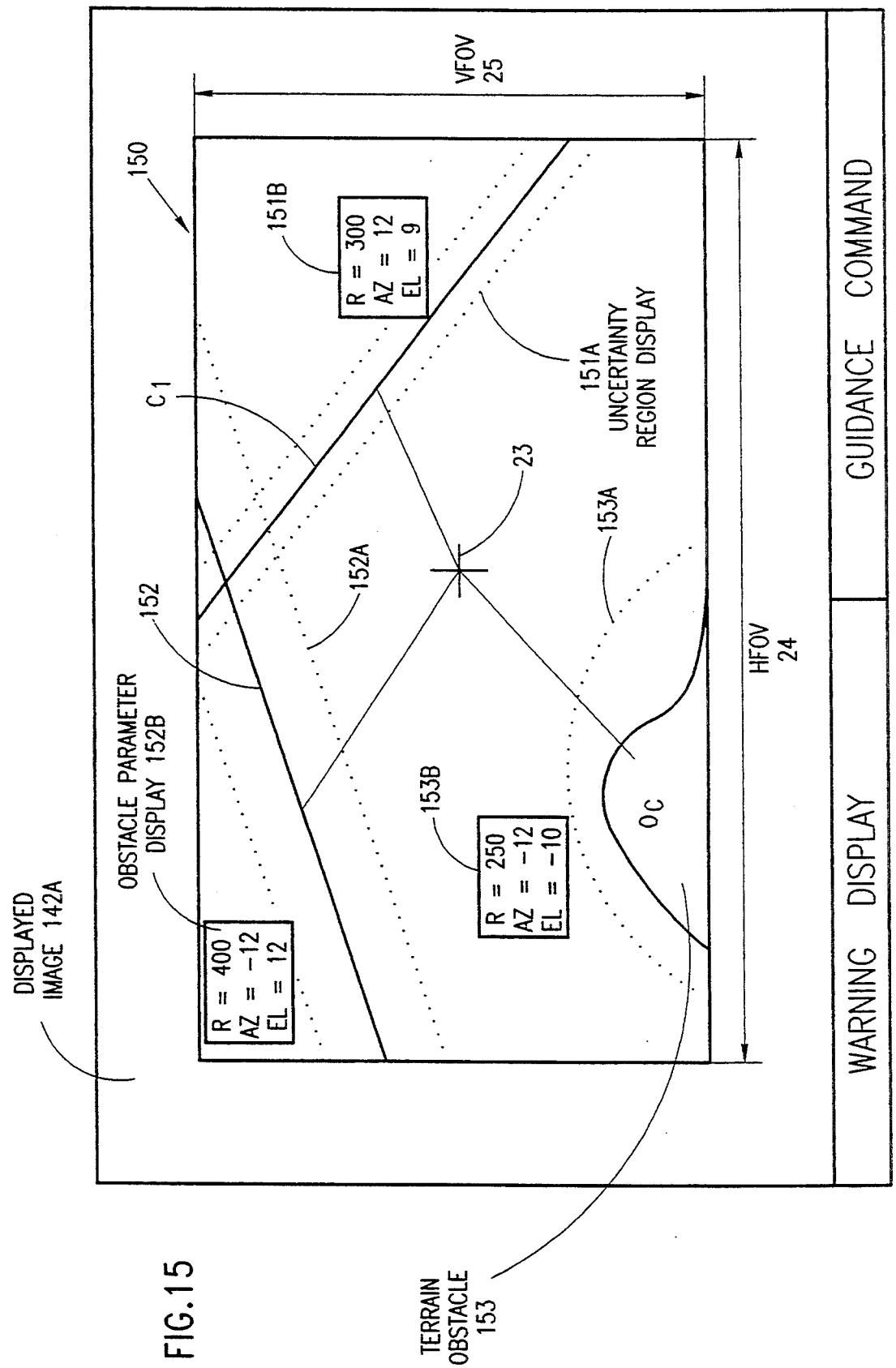
FIGS. 15 and 16 illustrate the format of the display, and a display image, respectively, in the apparatus of FIGS. 1 and 2.

FIG. 15 illustrates, at 150, the format of the images displayed in the display 142a. The obstacle image represents a sub-frame of the size of the dimensions of the HFOV (horizontal field of view)×VFOV (vertical field of view) on the screen of the display 142a. The obstacles can be the cables $C_1$, $C_2$ as shown at 151 and 152, respectively, and/or terrain features as shown at 153. They are represented by their actual positions in the form of solid lines, and include an uncertainty region, as indicated by broken lines 151a, 152a and 153a, respectively, around them because of measurement noise.

Each obstacle is associated with a point $O_a$, $O_b$ and $O_c$, respectively, representing the closest point of the obstacle to the aircraft. Each obstacle further includes a message box, as shown at 151b, 152b and 153b, respectively, containing the range to the respective point $O_A$, $O_B$, $O_C$, and the angles AZ (azimuth) and EL (elevation) between the pilot line-of-sight (21, FIG. 3) and the marking 22 (FIG. 1) on the panel display and the position of the respective point $O_A$, $O_B$, $O_C$. The message box 151b, 152b, 153b, associated with an obstacle is colored according to its alarm status.

Figure 16:
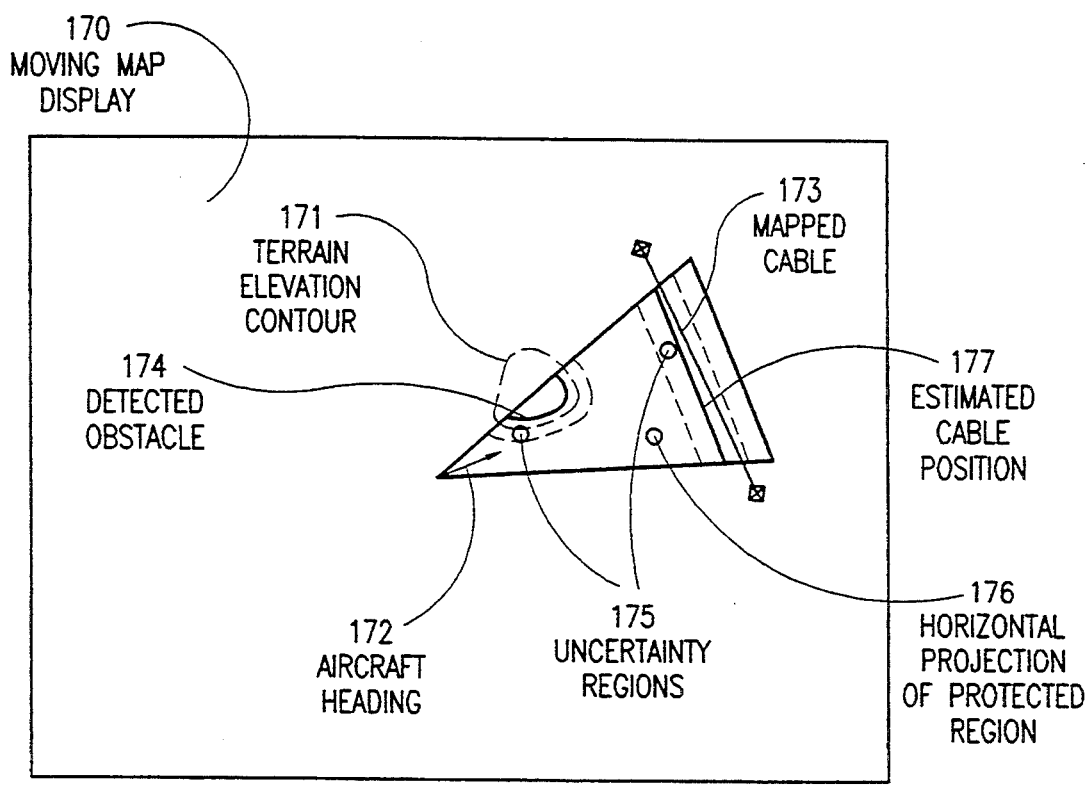

If the aircraft is equipped with a moving map display (142b, FIG. 14), commonly provided in helicopters, the obstacle display generator 145 produces an artificial dynamic moving image to the moving map display, indicating the horizontal projection of the obstacles onto the moving map. FIG. 16 illustrates such a display image. The moving map displayed, generally indicated at 170, in the moving map display 142a contains terrain elevation contours 171, aircraft heading 172, mapped high power line cables 173, geographical information data, and other features, as introduced by the digital terrain map 44 (FIG. 8). The obstacle display generator 145 (FIG. 14) generates images of detected obstacles, as shown at 174, uncertainty regions 175, the horizontal projection 176 of the protected region (20, FIG. 4), and estimated cable positions at 177. The cables are represented by solid lines whose colors correspond to their alarm status.

The Guidance Command Generator System 16

Figure 17:
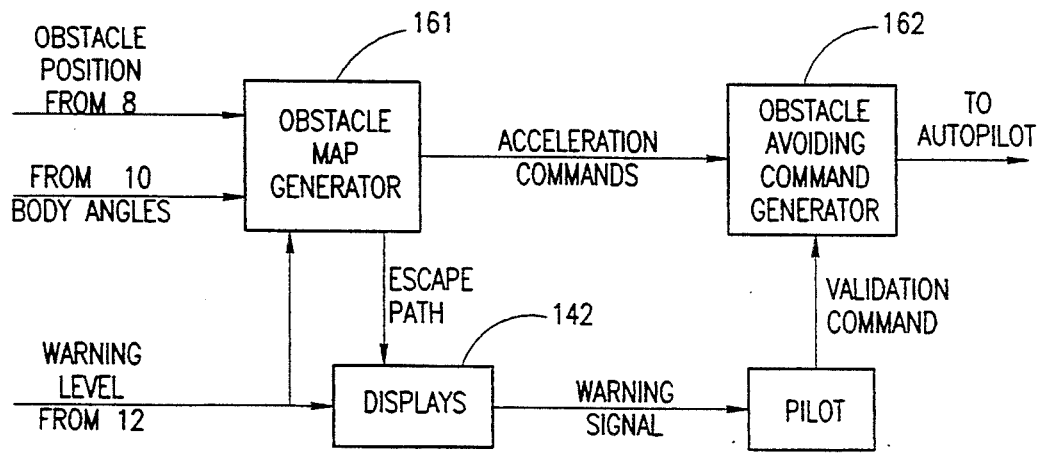
FIG. 17 is a block diagram illustrating the guidance command generator system.

FIG. 17 is a block diagram illustrating the guidance command generator system 16. As shown in FIG. 2, this system includes an obstacle map generator 161 which receives the following inputs: (1) the range and orientation of the obstacles, from the signal processing system 8; (2) the aircraft velocity and body angles from the aircraft inertial navigation system 10; and (3) the warning level signals, from the alarm decision system 12. The obstacle map generator 161 calculates, from the foregoing inputs, the escape path, namely the 3-D escape trajectory for the aircraft to follow in order to avoid the obstacle. This escape path is applied to the aircraft displays 142 for viewing by the pilot.

The obstacle map generator system 16 also generates, at the same time, the flight guidance acceleration commands applied to the obstacle avoiding command generator 162 for controlling the aircraft autopilot. However, as described earlier particularly with respect to the flow chart of FIG. 13, this control of the autopilot requires first the validation of the commands by the pilot before such commands can be executed.

Figure 18:
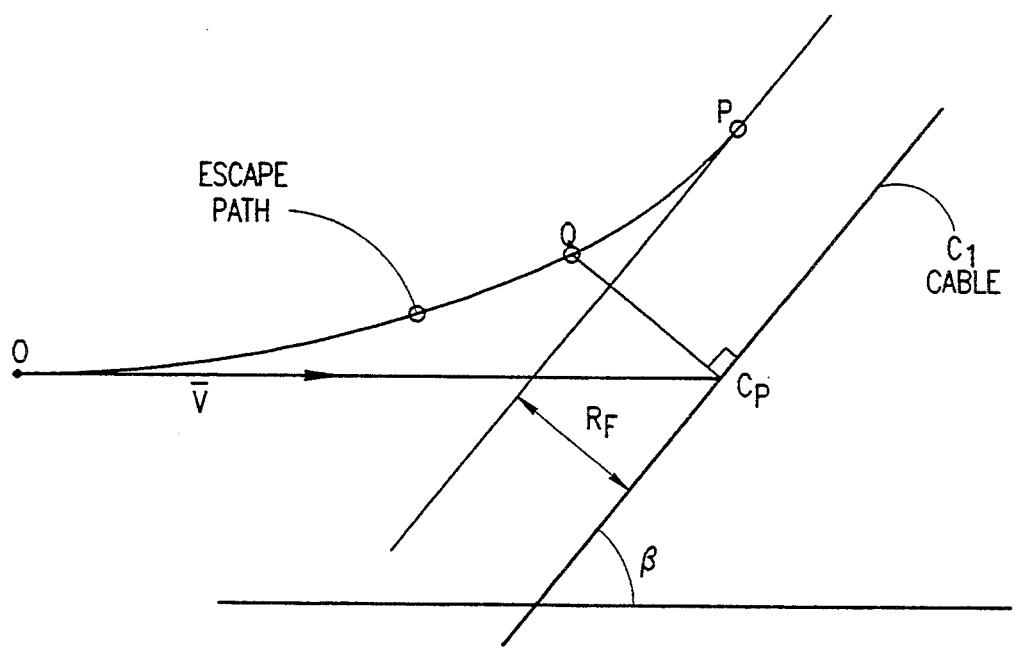
FIG. 18 illustrates an example of how an escape path is generated upon determining that the aircraft is on a collision course with a sensed obstacle.

FIG. 18 illustrates an example of how an escape path is generated by generator 161 and displayed in the aircraft display 142. In FIG. 18, the current velocity and heading of the aircraft is represented by the vector V. The collision point $C_P$ lies on the line defined by the vector V at a range which takes into account the response time of the pilot and measurement errors; that is, the response time multiplied by V is less than the range to the cable, i.e., $OC_P$. The orientation of the cable with respect to the heading direction of the aircraft is indicated as $\beta$. $R_F$ is the safety distance between the aircraft and the cable at the actual velocity V.

The escape path (EP) computed by the obstacle map generator 161 (FIG. 17) is indicated as EP and is tangent to the velocity vector V at the current position. It is also tangent to a line parallel to the cable at distance $R_F$ from it at a point P on its trajectory further than the point Q of intersection between the line perpendicular to the cable at $C_P$ and the trajectory. The obstacle is placed at such a distance to enable the aircraft to move on a given trajectory EP at maximum acceleration and velocity. The alarm decision system 12 is designed such that $t_{min}$ and $R_{min}$ stand for the previous condition.

While the invention has been described with respect to one preferred embodiment, it will be appreciated that this is set forth merely for purposes of example, and that many other variations, modifications and applications of the invention may be made.

What is claimed is:

1. Airborne obstacle collision avoidance apparatus, comprising:
   (a) object sensor means for sensing objects within a field of view of the aircraft;
   (b) an aircraft navigation system for navigating the aircraft through space;
   (c) signal processing means for receiving data from both the object sensor means and the aircraft navigation system, for generating map data of the objects within the field of view of the aircraft, for dynamically changing said map data as the aircraft moves through space, and for determining a probability that the aircraft is on a collision course with respect to each sensed object, said signal processing means further including a straight line filter to extract straight line features from said map data in order to facilitate identification of straight line obstacles, including electric cables and electric poles, said extraction of straight line features being based on the following straight line extraction criteria: (1) slope of said straight line obstacle relative to ground; (2) height of said straight line obstacle above ground; (3) length of said straight line obstacle; (4) number of said straight line obstacles sensed within said field of view of the aircraft; and (5) continuity of said straight line obstacle; and
   (d) alarm means for producing an alarm when said signal processing means determines there is a high probability that a current aircraft flight direction is on said collision course with respect to a sensed object.

2. The apparatus according to claim 1, wherein said alarm means includes a visual display, and display control means for visually displaying thereon the sensed objects and an indication of their probabilities of being located on said collision course with respect to the current flight direction of the aircraft.

3. The apparatus according to claim 2, wherein said display control means visually displays:
   (i) in a first color, objects at a relatively large distance from the aircraft;
   (ii) in a second color, objects that will become a danger of collision if no corrective action is taken; and
   (iii) in a third color, objects which represent a danger to the aircraft and require corrective action.

4. The apparatus according to claim 3, wherein said signal processing means causes the display of said third color to blink with respect to objects which immediately require the corrective action to avoid a collision.

5. The apparatus according to claim 4, wherein said alarm means also includes a speaker for sounding an audio alarm when an object of said third color is caused to blink.

6. The apparatus according to claim 2, wherein said display control means also visually displays a range of each detected object having a high probability of being located on said collision course with respect to the current flight direction.

7. The apparatus according to claim 6, wherein said display control means also visually displays an azimuth and elevation, with respect to the current flight direction, of each detected object having a high probability of being located on said collision course with respect to the current flight direction.

8. The apparatus according to claim 2, wherein said display control means displays, in full lines, the sensed objects having a high probability of being located on said collision course with respect to the current flight direction, and in broken lines, spaced at a distance from said full lines of said sensed objects, an uncertainty region caused by measurement noise.

9. The apparatus according to claim 1, further including guidance command generator means for generating an emergency escape flight guidance path, and for displaying said path to the pilot, in the event said signal processing means determines there is a danger of an imminent collision with said sensed object.

10. The apparatus according to claim 9, wherein said aircraft includes an autopilot, and said guidance command generator means also generates emergency escape flight guidance commands for execution by the autopilot if validated by the pilot.

11. The apparatus according to claim 1, wherein said signal processing means processes said map data to establish a table classifying each detected object according to a range of the object, altitude of object with respect to the flight direction, probability of collision with the object, and quality of decision.

12. The apparatus according to claim 11, wherein said signal processing means generates, from the data in said table, three additional sub-tables that partition the data at least according to the following:
   (A) a first sub-table, according to the ranges of all the objects included within a semi-sphere having a predetermined radius with the aircraft as its center;
   (B) a second sub-table, according to the time-to-collision if the aircraft continues in the same flight direction and at the same velocity; and
   (C) a third sub-table, illustrating the most dangerous object reflected by the other two sub-tables.

13. The apparatus according to claim 1, wherein said aircraft navigation system is an inertial navigation system.

14. The apparatus according to claim 1, wherein said signal processing means further includes means for processing said map data to define a boundary between the ground and the flight space.

15. The apparatus according to claim 1, wherein said obstacle sensor means includes an active electro-optical laser sensor measuring range and intensity.

16. The apparatus according to claim 1, wherein said obstacle sensor means includes an electromagnetic cable sensor.

* * * * *